(12) United States Patent
Abe et al.

(10) Patent No.: US 6,934,462 B2
(45) Date of Patent: Aug. 23, 2005

(54) SIGNAL PROCESSING APPARATUS AND METHOD, RECORDING MEDIUM, AND PROGRAM

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 10/194,763

(22) Filed: Jul. 12, 2002

(65) Prior Publication Data

US 2003/0091323 A1 May 15, 2003

(30) Foreign Application Priority Data

Jul. 17, 2001 (JP) ........................................ 2001-216716

(51) Int. Cl.[7] ............................. H04N 5/93; H04N 7/04
(52) U.S. Cl. ......................................... 386/54; 386/105
(58) Field of Search ............................. 386/46, 52, 53, 386/54, 55, 96, 124, 125, 45, 105, 106, 104, 39, 40, 4, 98; H04N 5/93, 7/04

(56) References Cited

U.S. PATENT DOCUMENTS 5,122,886 A * 6/1992 Tanaka ...................... 386/104
6,256,419 B1 * 7/2001 Nagasaka et al. .......... 382/236
2002/0105541 A1 * 8/2002 Endou et al. ............... 345/738

* cited by examiner

*Primary Examiner*—Robert Crevalier
(74) *Attorney, Agent, or Firm*—Robert J. Depke; Trexler, Bushnell, Giangiorgi, Blackstone & Marr (57) ABSTRACT

For accurate scene-change detection, the amplitudes of sub-band signals subjected to the spectral decomposition are detected, and the detected amplitudes are smoothed and sampled during smoothing. Then, the amount of spectral change is determined based on the smoothed sub-band amplitude and the smoothed sub-band amplitude which is one sampled amplitude before that smoothed sub-band amplitude. It is then determined whether or not the determined amount of spectral change is greater than a predetermined threshold, and processing is performed based on the determination result.

19 Claims, 10 Drawing Sheets

SIGNAL PROCESSING APPARATUS AND METHOD, RECORDING MEDIUM, AND PROGRAM

This application claims priority to Japanese Patent Application Number JP2001-216716 filed Jul. 17, 2001 which is incorporated herein by reference.

BACKGROUND OF THE INVENTION

1. Field of the Invention

The present invention relates to a signal processing apparatus and method, a recording medium, and a program. Particularly, the present invention relates to a signal processing apparatus and method capable of audio scene-change detection, a recording medium, and a program.

2. Description of the Related Art

In audio/video signals obtained from television broadcasts, radio broadcasts, video tape, video disk, or the like, points (scene changes) accompanied by a change of context or scene in the content are used for editing, indexing, searching, or summarizing such audio/video signals.

For example, scene-change detection is performed by detecting a shot cut accompanied by a large change in the video signal, i.e., a cut change, and by using the cut change as the scene change. However, there may sometimes be a plurality of cut changes in the same scene, thus causing more scene changes than necessary to be detected in such a scene-change detection method.

An approach disclosed in Japanese Unexamined Patent Application Publication No. 5-37893 is to record and play back the outline of a television signal by detecting the difference between frames of the video signal, and by sequentially recording and playing back still pictures at that time.

Japanese Unexamined Patent Application Publication No. 2000-5111743 discloses a method in which the minimum level of an audio signal in a certain interval is identified as a background audio level and a point accompanied by a large change in the background audio level is identified as a scene change.

In this method, however, scene changes may not be accurately detected because background audio and audio other than the background audio may not be clearly distinguished from each other, a scene change may not necessarily be accompanied by a change in the background audio level, there may be a change of background audio level in the same scene, etc.

Another possible method is to detect a silent interval as the scene change; however, there may be an abrupt change in the audio signal without any silent interval being inserted. Thus, scene changes may not be accurately detected in this method.

Therefore, there has been a problem in that scene changes may not be accurately detected.

SUMMARY OF THE INVENTION

Accordingly, the present invention is directed to accurate scene-change detection.

To this end, in a first aspect, the present invention provides a signal processing apparatus including an amplitude extraction unit and a change-point detection unit. The amplitude extraction unit extracts the amplitude of an input audio signal which has a plurality of contents in a time-division manner. The change-point detection unit detects a change point of content in the input audio signal based on the temporal change of the amplitude extracted by the amplitude extraction unit.

The amplitude extraction unit may divide the input audio signal into spectral signals, and may extract the amplitude of the spectral signals.

The amplitude extraction unit may divide the input audio signal into sub bands, and may extract the amplitude for each of the divided sub bands.

The change-point detection unit may smooth out the extracted amplitude for use.

The change-point detection unit may determine the amount of energy change using the amplitude, and may detect a change point of content in the input audio signal based on the amount of energy change.

If the input audio signal is frequency resolved and encoded together with a scaling factor, the amplitude extraction unit may extract the scaling factor as the amplitude.

The present invention further provides a signal processing method. The method includes an amplitude extracting step of extracting the amplitude of an input audio signal which has a plurality of contents in a time-division manner, and a change-point detecting step of detecting a change point of content in the input audio signal based on the temporal change of the amplitude extracted in the above-described amplitude extracting step.

The present invention further provides a recording medium having a program recorded thereon. The program includes an amplitude extracting step of extracting the amplitude of an input audio signal which has a plurality of contents in a time-division manner, and a change-point detecting step of detecting a change point of content in the input audio signal based on the temporal change of the amplitude extracted in the above-described amplitude extracting step.

The present invention further provides a program which causes a computer to execute a process including an amplitude extracting step of extracting the amplitude of an input audio signal which has a plurality of contents in a time-division manner, and a change-point detecting step of detecting a change point of content in the input audio signal based on the temporal change of the amplitude extracted in the above-described amplitude extracting step.

According to the present invention, therefore, the amplitude of an input audio signal having a plurality of contents in a time-division manner is extracted, and a change point of content in the input audio signal is detected based on the temporal change of the extracted amplitude. Thus, the change point can be accurately detected.

In a second aspect, the present invention provides a signal processing apparatus including an audio signal change-point detection unit. The audio signal change-point detection unit extracts the amplitude of an input audio signal in order to detect a change point of content in the input audio signal based on the temporal change of the extracted amplitude, so that video and audio in the vicinity of the detected change point are played back or recorded.

The audio and video signals may comprise a television broadcast signal, and the played or recorded video and audio may comprise a commercial message.

The present invention further provides a signal processing method. The method includes an audio signal change-point detecting step of extracting the amplitude of an input audio signal in order to detect a change point of content in the input audio signal based on the temporal change of the extracted amplitude, so that video and audio in the vicinity of the detected change point are played back or recorded.

The present invention further provides a recording medium having a program recorded thereon. The program includes an audio signal change-point detecting step of extracting the amplitude of an input audio signal in order to detect a change point of content in the input audio signal based on the temporal change of the extracted amplitude, so that video and audio in the vicinity of the detected change point are played back or recorded.

The present invention further provides a program which causes a computer to execute a process including an audio signal change-point detecting step of extracting the amplitude of an input audio signal in order to detect a change point of content in the input audio signal based on the temporal change of the extracted amplitude, so that video and audio in the vicinity of the detected change point are played back or recorded.

According to the present invention, therefore, the amplitude of an input audio signal is extracted, and a change point of content in the input audio signal is detected based on the temporal change of the extracted amplitude, so that video and audio in the vicinity of the detected change point of the audio signal are played back or recorded. Thus, the desired video and audio can be played back or recorded according to the change point.

In a third aspect, the present invention provides a signal processing apparatus including a video signal change-point detection unit and an audio signal change-point detection unit. The video signal change-point detection unit detects change points of content in an input video signal. The audio signal change-point detection unit extracts the amplitude of an input audio signal and detects change points of content in the input audio signal based on the temporal change of the extracted amplitude. Then, a signal for predetermined content is detected based on a time interval between the detected change points of content in the input audio signal and between the detected change points of content in the input video signal.

The present invention further provides a signal processing method. The method includes a video signal change-point detecting step of detecting change points of content in an input video signal, and an audio signal change-point detecting step of extracting the amplitude of an input audio signal in order to detect change points of content in the input audio signal based on the temporal change of the extracted amplitude, so that a signal for predetermined content is detected based on a time interval between the detected change points of content in the input audio signal and between the detected change points of content in the input video signal.

The present invention further provides a recording medium having a program recorded thereon. The program includes a video signal change-point detecting step of detecting change points of content in an input video signal, and an audio signal change-point detecting step of extracting the amplitude of an input audio signal in order to detect change points of content in the input audio signal based on the temporal change of the extracted amplitude, so that a signal for predetermined content is detected based on a time interval between the detected change points of content in the input audio signal and between the detected change points of content in the input video signal.

The present invention further provides a program which causes a computer to execute a process including a video signal change-point detecting step of detecting change points of content in an input video signal, and an audio signal change-point detecting step of extracting the amplitude of an input audio signal in order to detect change points of content in the input audio signal based on the temporal change of the extracted amplitude, so that a signal for predetermined content is detected based on a time interval between the detected change points of content in the input audio signal and between the detected change points of content in the input video signal.

According to the present invention, therefore, change points of content in an input video signal are detected, and the amplitude of an input audio signal is extracted in order to detect change points of contents in an input audio signal based on the temporal change of the extracted amplitude, so that a signal for predetermined content is detected based on a time interval between the detected change points of content in the input audio signal and between the detected change points of content in the input video signal. Thus, a signal for predetermined content corresponding to change points can be detected.

DESCRIPTION OF THE PREFERRED EMBODIMENTS

Figure 1:
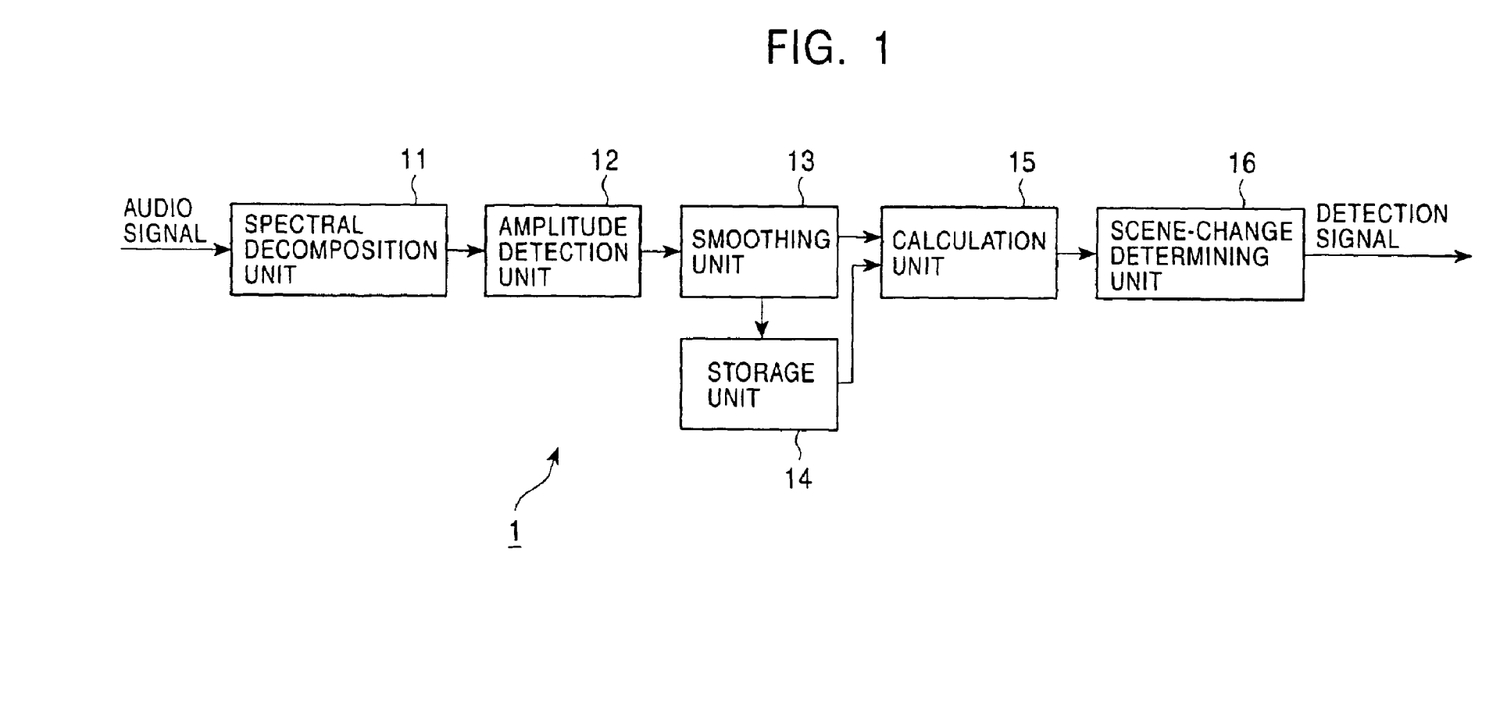
FIG. 1 is a block diagram of an audio signal processing apparatus according to the present invention.

FIG. 1 shows the structure of an audio signal processing apparatus 1 according to the present invention. In FIG. 1, the audio signal in audio/video signals which constitute the content is input to the audio signal processing apparatus 1.

A spectral decomposition unit 11 includes a group of band-pass filters and an FFT (fast Fourier transform) unit, and decomposes the input audio signal into signals in a plurality of frequency bands. The decomposed signals in the plurality of frequency bands (hereinafter referred to "sub-band signals") are supplied to an amplitude detection unit 12.

The amplitude detection unit 12 detects the amplitudes of the sub-band signals from the spectral decomposition unit 11, and supplies the detection result to a smoothing unit 13.

The smoothing unit 13 is formed of smoothing filters, such as a median filter, a mode filter, and a minimum filter, and smoothes out abrupt changes in the sub-band signal amplitudes supplied from the amplitude detection unit 12. The smoothing unit 13 samples the smoothed amplitudes of the sub-band signals (hereinafter referred to as "smoothed sub-band amplitudes") during smoothing, and outputs the sampling result to a storage unit 14 and a calculation unit 15.

Alternatively, the smoothing unit 13 may average the amplitudes of the sub-band signals for a predetermined interval (several seconds) in order to smooth out the amplitudes of the sub-band signals.

The storage unit 14 stores the smoothed sub-band amplitudes for one sampling interval or several sampling intervals.

The calculation unit 15 calculates the following Equation (1) using the smoothed sub-band amplitudes supplied from the smoothing unit 13 and the storage unit 14, and determines the amount of spectral change D:

$$D = \min_{w} \frac{\sum_{k=1}^{K} \{F(n, k) - wF(n-1, k)\}^2}{\sum_{k=1}^{K} F^2(n, k)} \quad \text{Eq. (1)}$$

where n denotes the sampling time, k denotes the frequency band of the sub-band signals, K denotes the number of sub-band signals, and F(n, k) indicates the smoothed sub-band amplitude at the sampling time n in the frequency band k.

Equation (1), in which a plurality of predetermined values are sequentially set for "w", is calculated, and the value of "w" that minimizes the calculation result is determined. The calculation result at this time corresponds to the amount of spectral change D. The amount of spectral change D is a value (from zero to one) found by normalizing a differential energy between the spectrum at time n and the spectrum at time (n−1) by the current spectral energy.

In practice, the amount of spectral change D is found by calculating Equation (2) equivalent to Equation (1) in order to simplify the calculation. The value $S_{aa}$, $S_{bb}$, and $S_{ab}$ are defined by Equations (3), (4), and (5), respectively:

$$D = \frac{S_{aa}S_{bb} - S_{ab}^2}{S_{aa}S_{bb}} \quad \text{Eq. (2)}$$

$$S_{aa} = \sum_{k=1}^{K} F(n, k)F(n, k) \quad \text{Eq. (3)}$$

$$S_{bb} = \sum_{k=1}^{K} F(n-1, k)F(n-1, k) \quad \text{Eq. (4)}$$

$$S_{ab} = \sum_{k=1}^{K} F(n, k)F(n-1, k) \quad \text{Eq. (5)}$$

The calculation unit 15 outputs the determined amount of spectral change D to a scene-change determining unit 16, as necessary.

The scene-change determining unit 16 determines whether or not the amount of spectral change D from the calculation unit 15 is greater than a predetermined threshold. If it is determined that the amount of spectral change D is greater than the threshold, then, for example, the position (time) of the audio signal at which that amount of spectral change D was obtained is output as a scene-change detection signal.

If a plurality of scene changes are detected adjacent to each other, one of these scene changes may be used as the scene change.

Figure 2:
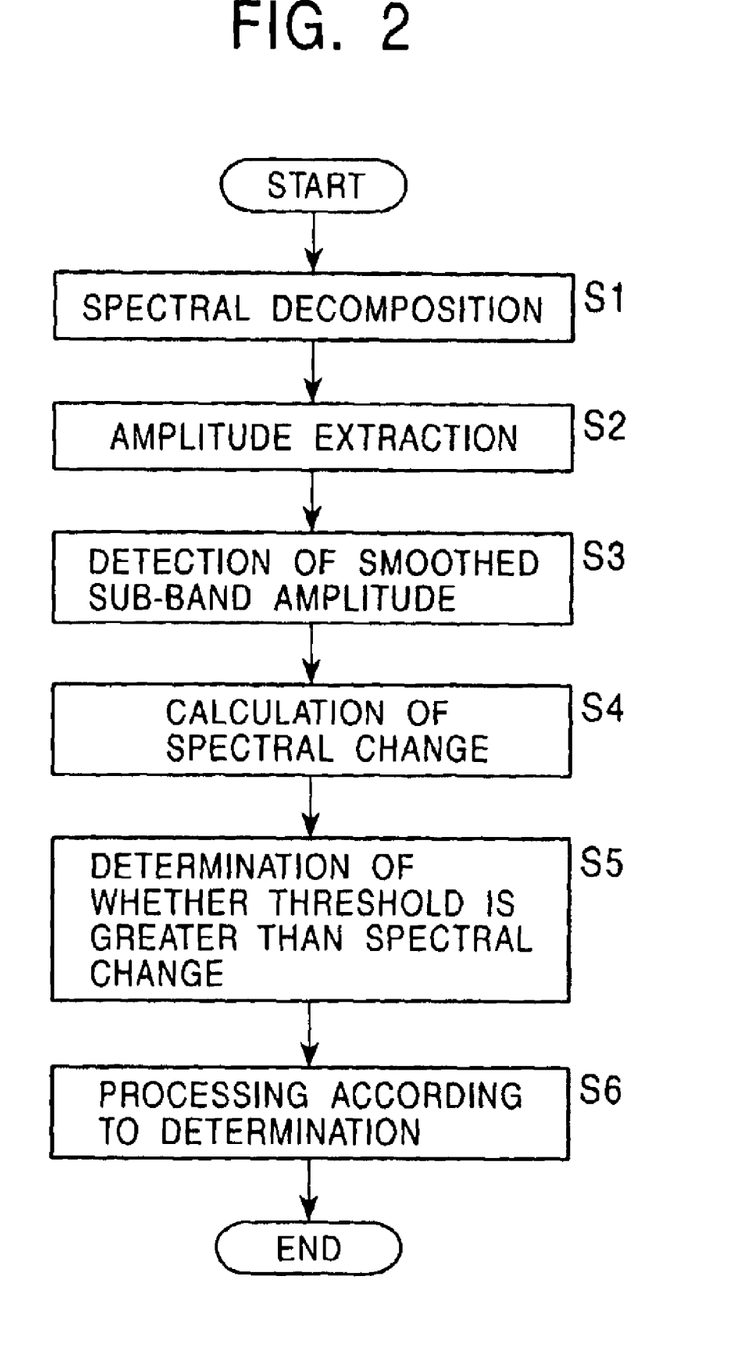
FIG. 2 is a flowchart showing the operation of the audio signal processing apparatus shown in FIG. 1.

The operation of the audio signal processing apparatus 1 is now described with reference to the flowchart of FIG. 2. It is assumed herein that a scene change is detected from a television broadcast audio signal shown in (A) of FIG. 3.

In step S1, the spectral decomposition unit 11 decomposes an input television broadcast audio signal into sub-band signals in eight frequency bands. In step S2, the amplitude detection unit 12 detects the amplitudes of the sub-band signals from the spectral decomposition unit 11, and outputs the detection result to the smoothing unit 13.

Figure 3:
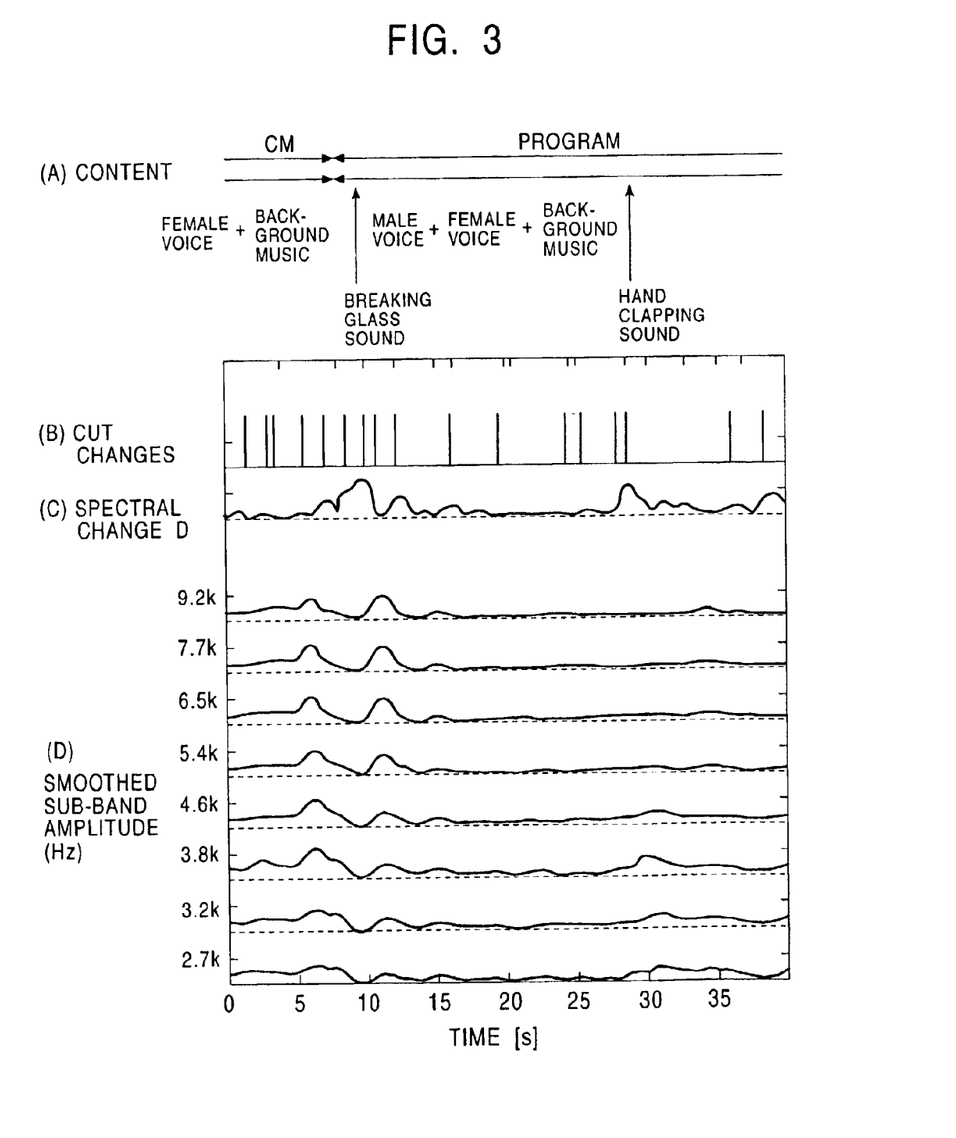
FIG. 3 is a chart for illustrating spectral change.

In step S3, the smoothing unit 13 smoothes out the amplitudes of the sub-band signals in the manner shown in (D) of FIG. 3, and samples the amplitudes during smoothing. Then, the sampling result is output to the storage unit 14 and the calculation unit 15. The smoothed sub-band amplitudes of the sub-band signals are shown in (D) of FIG. 3. In (D) of FIG. 3, the ordinate indicates the center frequencies of the frequency bands.

In step S4, the calculation unit 15 calculates Equation (2) using the smoothed sub-band amplitude F(n, k) from the smoothing unit 13 and the smoothed sub-band amplitude F(n−1, k) from the storage unit 14, which is one sampled amplitude before F(n, k), and determines the amount of spectral change D.

Figure 4:
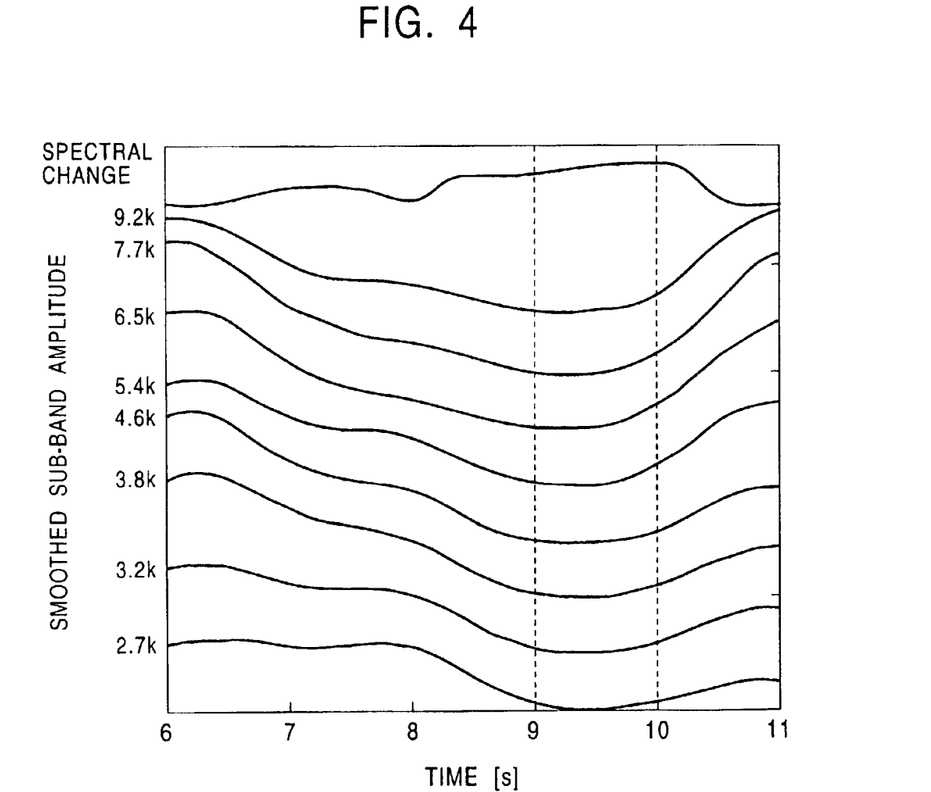
FIG. 4 is a chart for illustrating spectral change.

In (A) of FIG. 3, the broadcast content is changed from a commercial to a television program at a time of about 10 seconds. As shown in FIG. 4, which is an expanded chart for illustrating the smoothed sub-band amplitudes in that time zone, the rate of change differs from one smoothed sub-band amplitude to another. Specifically, the rate is large in the high-frequency region and is small in the low-frequency region. Thus, as shown in (C) of FIG. 3, the amount of spectral change D is large around that time.

In (A) of FIG. 3, the amount of spectral change D is also large at about 13 seconds when a breaking glass sound occurs, and at about 29 seconds when a hand clapping sound occurs.

In step S5, the scene-change determining unit 16 determines whether or not the amount of spectral change D found by the calculation unit 15 is greater than a predetermined threshold. In step S6, then, the scene-change determining unit 16 performs processing based on the determination result.

For example, if it is determined that the amount of spectral change D is greater than the threshold, the scene-change determining unit 16 outputs a scene-change detection signal to an external device.

Then, the process terminates, and the routine from steps S1 through S6 is performed on the subsequently input audio signal.

According to the present invention, therefore, during the television broadcast shown in FIG. 3, the point at which the content is changed from a commercial to a program, the point at which a breaking glass sound occurs, and the point at which a hand clapping sound occurs are detected as the scene changes.

According to a video signal based method in the related art, however, a plurality of cut changes (scene changes) would be detected in the same scene (for example, a single commercial), as indicated by the vertical lines in (B) of FIG. 3.

Figure 5:
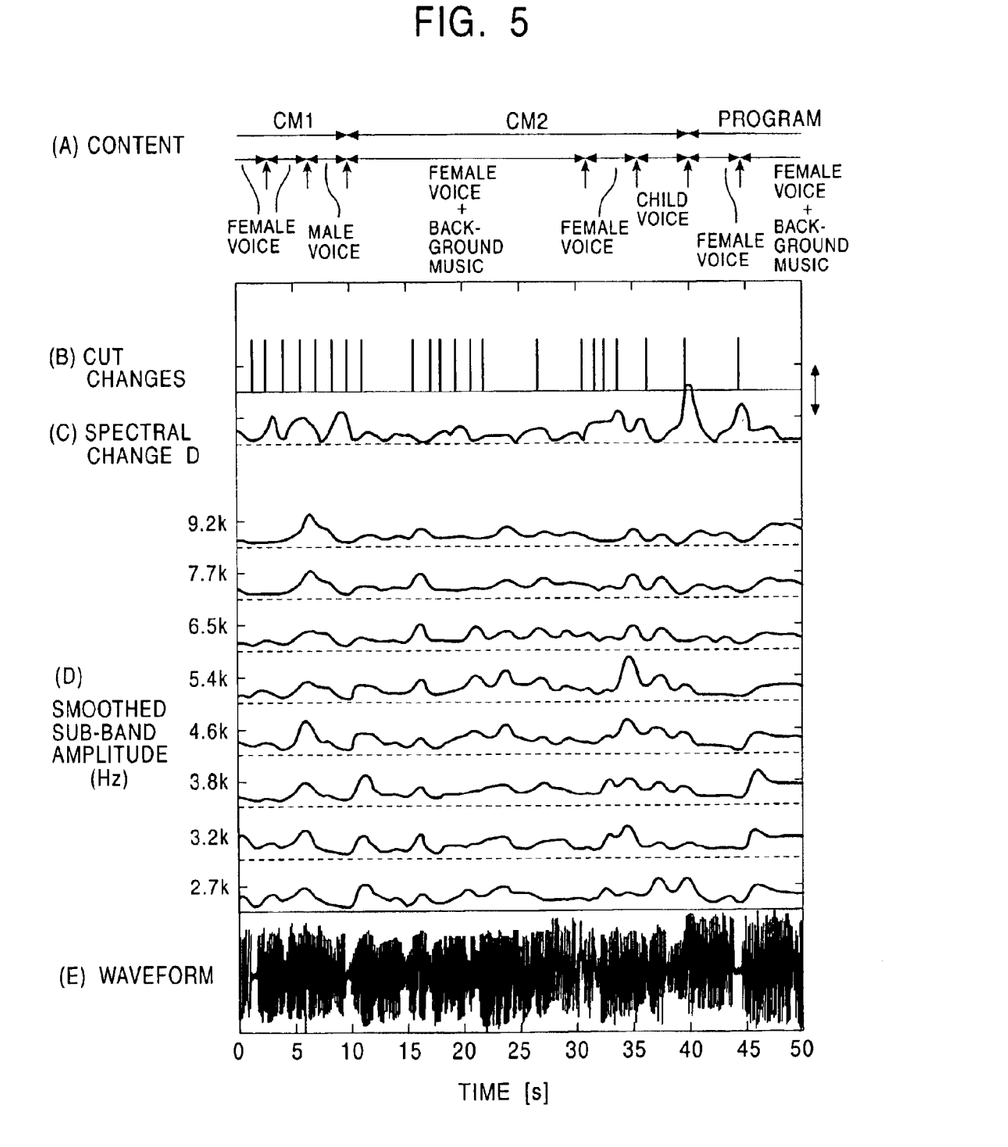
FIG. 5 is a chart for illustrating spectral change.

FIG. 5 is a chart for another television broadcast audio signal in which scene changes are detected.

As shown in (C) of FIG. 5, the amount of spectral change D is large at the points at which voices change, at the point at which the content is changed from a commercial (CM) 1 to a commercial (CM) 2, and at the point at which the commercial 2 changes to a program, as indicated by upward arrows in (A). These points are detected as the scene changes. In contrast, according to a video signal based method in the related art, a plurality of cut changes would be detected in the same scene, as depicted in (B). The waveform of the audio signal is shown in (E).

Figure 6:
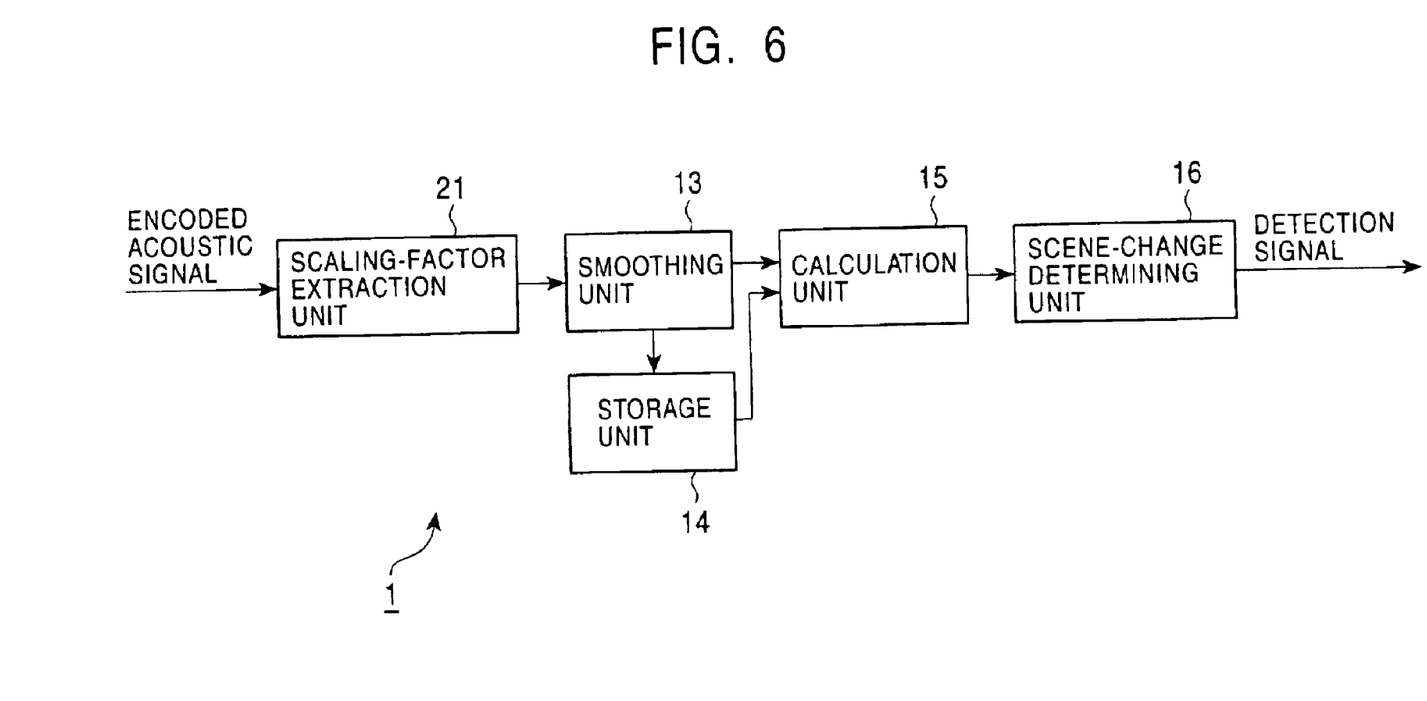
FIG. 6 is a block diagram of a modification of the audio signal processing apparatus according to the present invention.

FIG. 6 shows a modification of the audio signal processing apparatus 1. The modified audio signal processing apparatus 1 includes a scaling-factor extraction unit 21, in place of the spectral decomposition unit 11 and the amplitude detection unit 12 shown in FIG. 1. The other components are the same as those in FIG. 1.

An audio signal which has been encoded by an encoding method such as MPEG-1 using frequency resolution is input to the audio signal processing apparatus 1 shown in FIG. 6. For MPEG-1 encoding, typically, a signal subjected to frequency resolution is normalized in order to improve the encoding efficiency, and the scaling factor calculated for the normalization is encoded together with the audio signal.

Thus, the scaling-factor extraction unit 21 extracts the scaling factors of the sub-band signals from the encoded input signal, and supplies them to the smoothing unit 13.

The smoothing unit 13 smoothes out abrupt changes in the scaling factors supplied from the scaling-factor extraction unit 21. The smoothing unit 13 samples the smoothed scaling factors during smoothing, and outputs the sampling result to the storage unit 14 and the calculation unit 15.

As in FIG. 1, the calculation unit 15 calculates Equation (2) based on the sampling values from the smoothing unit 13 and the storage unit 14 to determine the amount of spectral change D. The scene-change determining unit 16 determines scene changes based on the amount of spectral change D.

Since the scaling factor is substantially proportional to the average amplitude in the frames of each frequency band, the scaling factor can be used to detect a scene change. This enables scene changes to be detected without having to decode the encoded signals.

Figure 7:
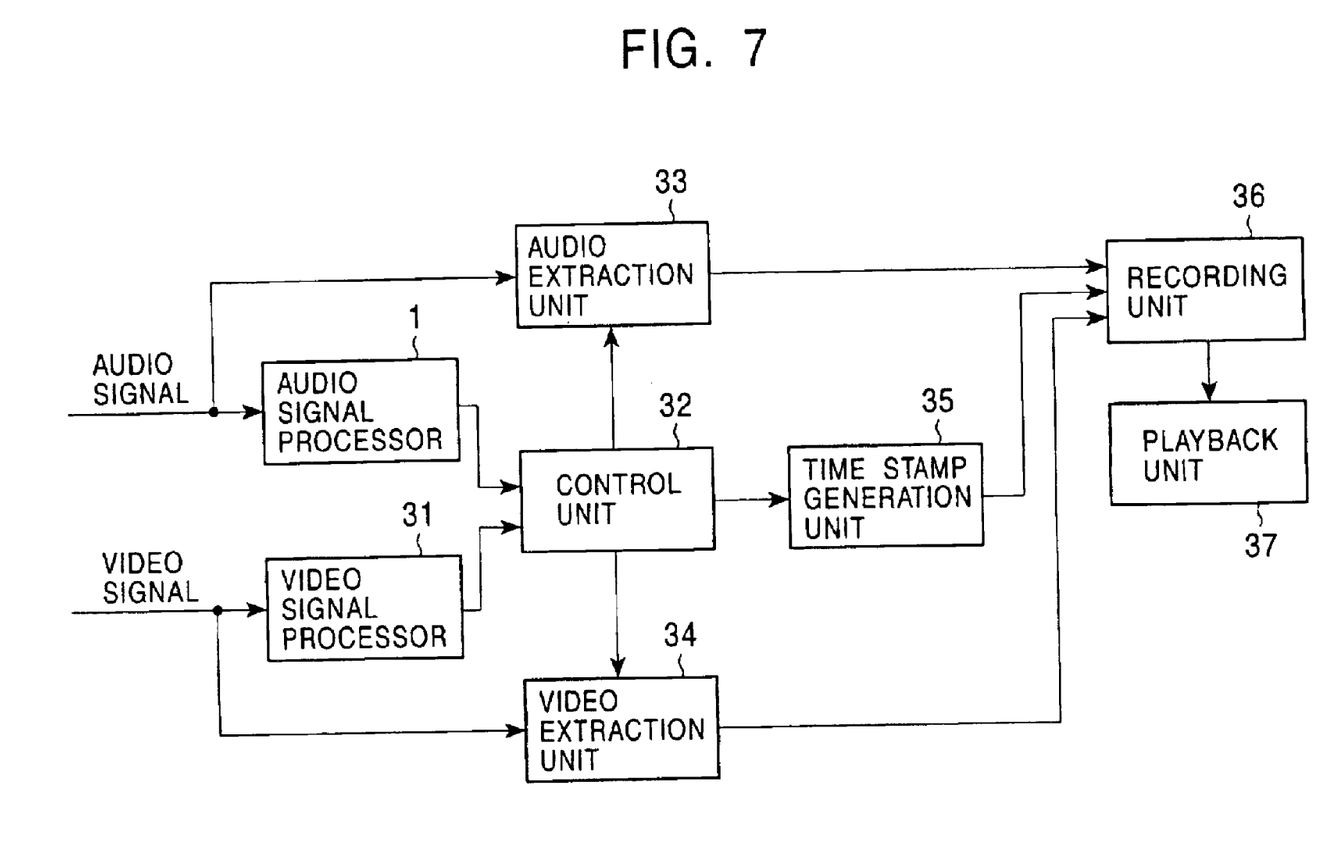
FIG. 7 is a block diagram of a record/playback apparatus according to the present invention.

FIG. 7 shows the structure of a record/playback apparatus using the audio signal processing apparatus 1. The record/playback apparatus is capable of recording and playing back a representative image or a representative sound from audio/video signals that constitute the content. For example, the representative image or representative sound recorded on the record/playback apparatus is visually or audibly presented to a user, thus allowing the user to readily grasp the content. A user may also use images or sounds recorded thereon for index searching the content to quickly locate the beginning of recorded programs.

As previously described, the signal processing apparatus 1 detects scene changes based on the amount of spectral change D of the input audio signal, and outputs the detection result to a control unit 32.

A video signal processing unit 31 detects a portion accompanied by a large change in the input video signal, i.e., a cut change, and outputs the detection result to the control unit 32. The video signal processing unit 31 detects cut changes using, for example, the technique disclosed in Japanese Unexamined Patent Application Publication No. 5-37893.

The control unit 32 determines a representative image and a representative sound based on the detection results from the audio signal processing apparatus 1 and from the video signal processing unit 31.

For example, if a scene change (cut change) is detected by either the audio signal processing apparatus 1 or the video signal processing unit 31 or is detected by both at substantially the same time, the control unit 32 sets the image and sound corresponding to the scene change as the representative image and sound.

When determining the representative image and sound, the control unit 32 outputs the start time and duration of the image and sound to an audio extraction unit 33, a video extraction unit 34, and a time stamp generation unit 35.

The audio extraction unit 33 extracts, from the input audio signal, audio corresponding to the information from the control unit 32, and outputs it to a recording unit 36. The video extraction unit 34 extracts, from the input video signal, video corresponding to the information from the control unit 32, and outputs it to the recording unit 36.

Based on the information from the control unit 32, the time stamp generation unit 35 generates a time stamp, based on which the audio signal extracted by the audio extraction unit 33 and the video signal extracted by the video extraction unit 34 are correctly played back. The time stamp generation unit 35 then outputs the time stamp to the recording unit 36.

The recording unit 36 uses a recording medium such as a magnetic tape, a magnetic disk, an optical disk, or a magneto-optical disk. The recording unit 36 records the audio signal from the audio extraction unit 33 and the video signal from the video extraction unit 34 in such a manner that these signals are associated with the time stamp from the time stamp generation unit 35.

A playback unit 37 plays back the audio (representative sound) and the video (representative image), which are recorded on the recording unit 36, if necessary.

Figure 8:
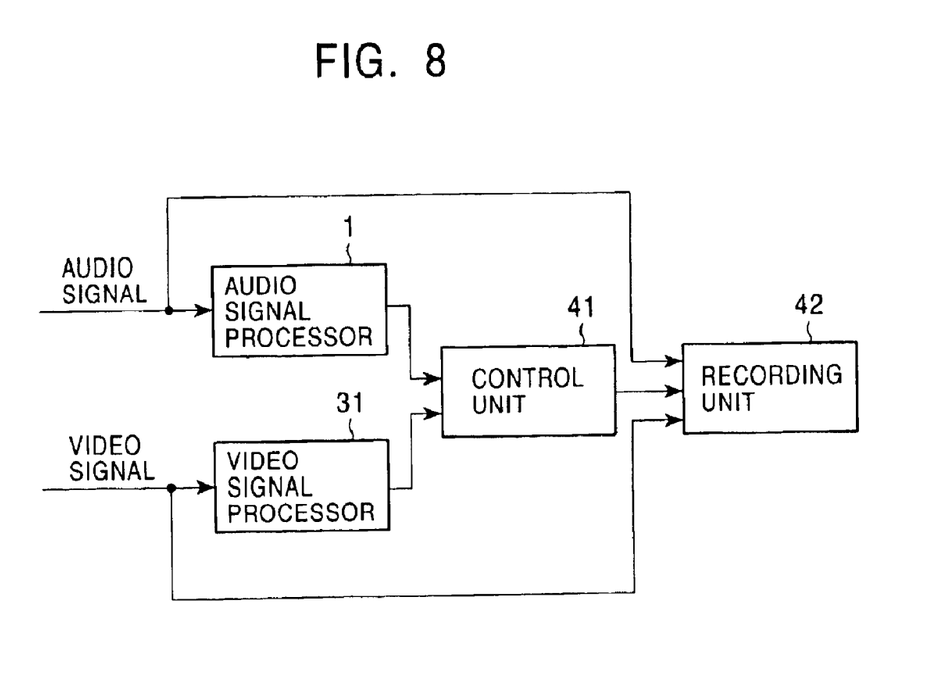
FIG. 8 is a block diagram of a CM detection apparatus according to the present invention.

FIG. 8 shows the configuration of a CM detection apparatus using the audio signal processing apparatus 1. The CM detection apparatus is capable of detecting a commercial message (CM) added to a television program.

The audio signal processing apparatus 1 detects scene changes based on the amount of spectral change D of an input television broadcast audio signal, as previously described, and outputs the detection result to a control unit 41.

The video signal processing unit 31, which is equivalent to the video signal processing unit 31 in the record/playback apparatus shown in FIG. 7, detects a cut change from the input television broadcast video signal, and outputs the detection result to the control unit 41.

The control unit 41 detects the start time and duration of the commercial based on the detection results from the signal processing apparatus 1 and from the video processing unit 31, and outputs them to a recording unit 42.

The recording unit 42 records the start time and duration of the commercial from the control unit 41 together with the input audio and video signals.

Figure 9:
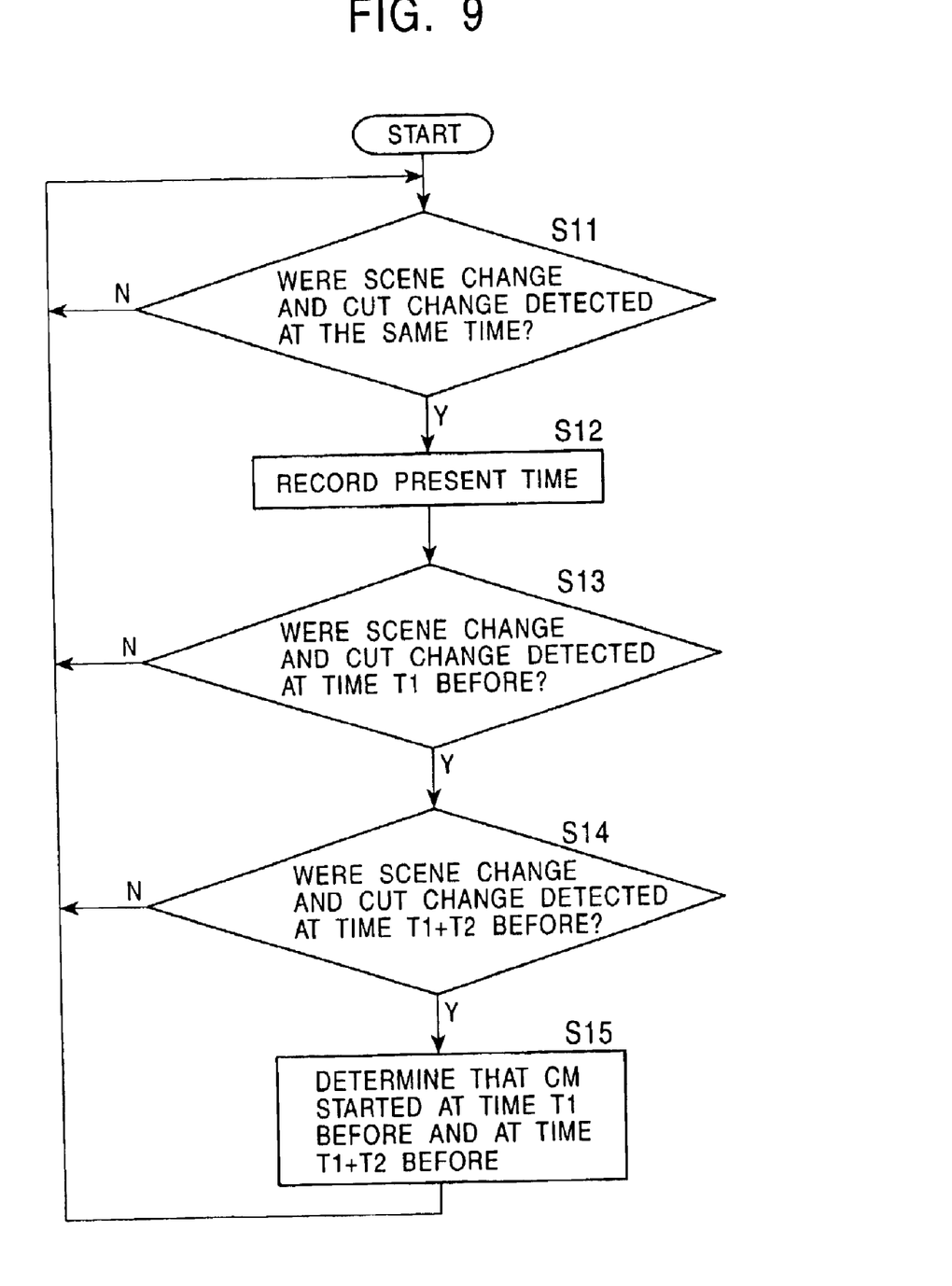
FIG. 9 is a flowchart showing the operation of the CM detection apparatus shown in FIG. 8.

The operating routine for the control unit 41 in the CM detection apparatus is now described with reference to the flowchart of FIG. 9.

In step S11, based on the detection results from the audio signal processing apparatus 1 and from the video signal processing unit 31, the control unit 41 determines whether or not an acoustic scene change and a video cut change were detected at substantially the same time. If it is determined that both were detected at substantially the same time, the routine proceeds to step S12, in which the time at which both were detected is recorded in an internal memory.

In step S13, the control unit 41 determines whether or not both the scene change and the cut change were detected around a time T1 before the time recorded in step S12. If it is determined that both were detected around that time, the routine proceeds to step S14.

Since the time when both the scene change and the cut change were simultaneously detected has been recorded in the memory in step S12, the control unit 41 refers to the content of the memory for the determination in step S13.

The time T1 indicates the duration of a commercial broadcast. The commercials broadcasted on TV are created according to standards specified by a broadcaster, and the duration thereof is limited. For example, in Japan, substantially all commercials, except for special cases, are created as 15-second, 30-second, or 60-second commercials. That is, the time T1 indicates any of the above durations.

In step S14, the control unit 41 determines whether or not both the scene change and the cut change were detected around a time (T1+T2) before the time recorded in the step S12. If it is determined that both were detected around that time, the routine proceeds to step S15.

The time T2 also indicates the duration of a commercial broadcast, that is, 15 seconds, 30 seconds, or 60 seconds.

In step S15, the control unit 41 determines that a time T1 before the time recorded in step S12 and a time (T1+T2) before the recorded time are the start times for commercials. The control unit 41 then outputs the detected start times for commercials and the durations thereof, i.e., T1 and (T1+T2), to the recording unit 42. The recording unit 42 records the start times and durations for commercials from the control unit 41 together with the input audio and video signals.

If it is determined in steps S11, S13, and S14 that a scene change and a cut change were not detected at substantially the same time, or if the start times and durations for commercials are detected in step S15, the routine returns to step S11, and the subsequent processing is then performed on the subsequently input detection results for scene changes and cut changes.

The foregoing routine may be implemented by hardware or software. When the routine is implemented by software, a program constituting the software is installed in a computer, and the program is executed on the computer so that the audio signal processing apparatus 1 is functionally implemented.

Figure 10:
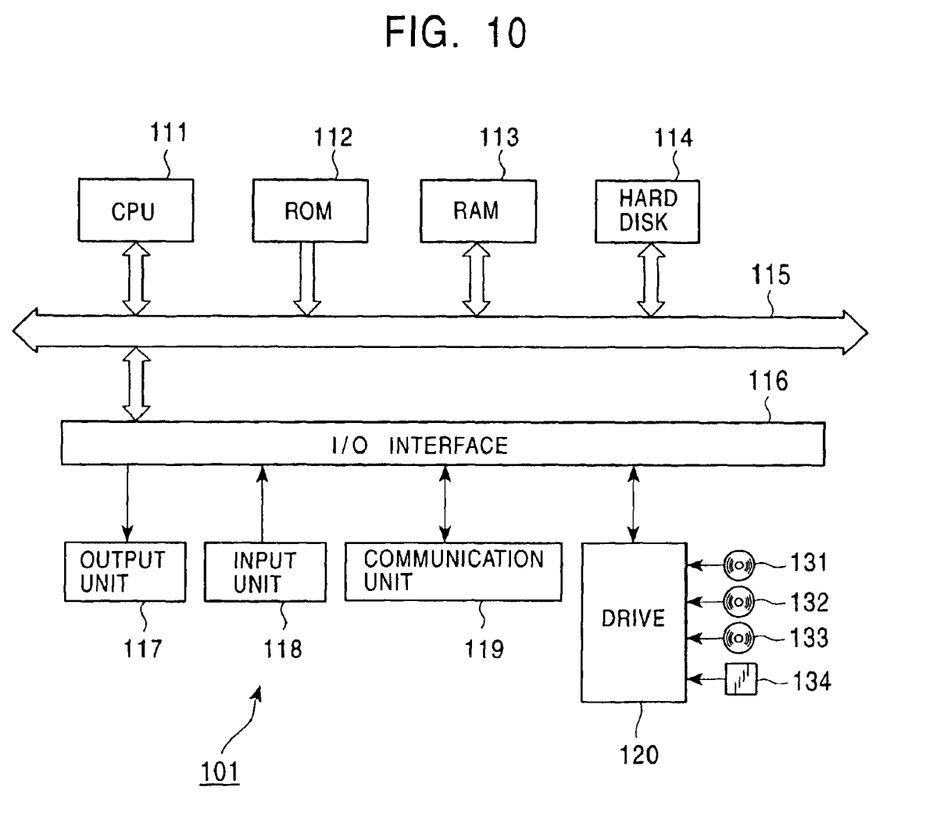
FIG. 10 is a block diagram of a personal computer.

FIG. 10 is a block diagram of an embodiment of a computer 101 which functions as the audio signal processing apparatus 1. An input/output (I/O) interface 116 is connected to a CPU (central processing unit) 111 via a bus 115. Once a user enters an instruction from an input unit 118, including a keyboard and a mouse, via the I/O interface 116, the CPU 111 causes the program stored on a recording medium such as a ROM (read-only memory) 112, a hard disk 114, or a magnetic disk 131, an optical disk 132, a magneto-optical disk 133 or a semiconductor memory 134, which is inserted onto a drive 120, to be loaded into a RAM (random access memory) 113 and to be executed. Then, the above-described processing is performed. The CPU 111 further causes the processing result to be output, if necessary, on an output unit 117 such as an LCD (liquid crystal display) via the I/O interface 116. The program, which is stored in the hard disk 114 or the ROM 112 in advance, may be provided for users in such a manner as to be combined with the computer 101. Alternatively, packaged media such as the magnetic disk 131, the optical disk 132, the magneto-optical disk 133, and the semiconductor memory 145 may contain the program. The program may also be downloaded to the hard disk 114 from a satellite, a network, etc., via a communication unit 119.

It is to be understood that the step for describing the program provided by the recording medium, as defined herein, encompasses not only a routine executed in a time-series manner according to the sequence described, but also a routine executed in parallel or in a discrete manner if the routine is not necessarily performed in a time-series manner.

What is claimed is:

1. A signal processing apparatus comprising:
   amplitude extraction means for extracting the amplitude of an input audio signal, the audio signal having a plurality of contents in a time-division manner; and
   change-point detection means for detecting a change point of content in the input audio signal based on the temporal change of the amplitude extracted by said amplitude extraction means.

2. A signal processing apparatus according to claim 1, wherein said amplitude extraction means divides the input audio signal into spectral signals, and extracts the amplitude of the spectral signals.

3. A signal processing apparatus according to claim 1, wherein said amplitude extraction means divides the input audio signal into sub bands, and extracts the amplitude for each of the divided sub bands.

4. A signal processing apparatus according to claim 1, wherein said change-point detection means smoothes out the extracted amplitude for use.

5. A signal processing apparatus according to claim 1, wherein said change-point detection means determines the amount of energy change using the amplitude, and detects a change point of content in the input audio signal based on the amount of energy change.

6. A signal processing apparatus according to claim 1, wherein the input audio signal is frequency resolved and encoded together with a scaling factor, and said amplitude extraction means extracts the scaling factor as the amplitude.

7. A signal processing method comprising:
   an amplitude extracting step of extracting the amplitude of an input audio signal, the audio signal having a plurality of contents in a time-division manner; and
   a change-point detecting step of detecting a change point of content in the input audio signal based on the temporal change of the amplitude extracted in said amplitude extracting step.

8. A recording medium having a computer-readable program recorded thereon, the program comprising:
   an amplitude extracting step of extracting the amplitude of an input audio signal, the audio signal having a plurality of contents in a time-division manner; and
   a change-point detecting step of detecting a change point of content in the input audio signal based on the temporal change of the amplitude extracted in said amplitude extracting step.

9. A program which causes a computer to execute a process comprising:
   an amplitude extracting step of extracting the amplitude of an input audio signal, the audio signal having a plurality of contents in a time-division manner; and
   a change-point detecting step of detecting a change point of content in the input audio signal based on the temporal change of the amplitude extracted in said amplitude extracting step.

10. A signal processing apparatus to which audio and video signals are input, the audio and video signals having a plurality of contents in a time-division manner, the apparatus comprising;
    audio signal change-point detection means for extracting the amplitude of the input audio signal, and for detecting a change point of content in the input audio signal based on the temporal change of the extracted amplitude,
    wherein video and audio in the vicinity of the detected change point are played back or recorded.

11. A signal processing apparatus according to claim 10, wherein the audio and video signals comprise a television broadcast signal, and the played or recorded video and audio comprise a commercial message.

12. A signal processing method for a signal processing apparatus to which audio and video signals are input, the audio and video signals having a plurality of contents in a time-division manner, the method comprising:

an audio signal change-point detecting step of extracting the amplitude of the input audio signal in order to detect a change point of content in the input audio signal based on the temporal change of the extracted amplitude, wherein video and audio in the vicinity of the detected change point are played back or recorded.

13. A recording medium having recorded thereon a computer-readable program for a signal processing apparatus to which audio and video signals are input, the audio and video signals having a plurality of contents in a time-division manner, the program comprising:

an audio signal change-point detecting step of extracting the amplitude of the input audio signal in order to detect a change point of content in the input audio signal based on the temporal change of the extracted amplitude, wherein video and audio in the vicinity of the detected change point are played back or recorded.

14. A program for a signal processing apparatus to which audio and video signals are input, the audio and video signals having a plurality of contents in a time-division manner, the program performing a computer-executable process comprising:

an audio signal change-point detecting step of extracting the amplitude of the input audio signal in order to detect a change point of content in the input audio signal based on the temporal change of the extracted amplitude, wherein video and audio in the vicinity of the detected change point are played back or recorded.

15. A signal processing apparatus to which audio and video signals are input, the audio and video signals having a plurality of contents in a time-division manner, the apparatus comprising:

video signal change-point detection means for detecting change points of content in the input video signal; and audio signal change-point detection means for extracting the amplitude of the input audio signal and for detecting change points of content in the input audio signal based on the temporal change of the extracted amplitude, wherein a signal for predetermined content is detected based on a time interval between the detected change points of content in the input audio signal and between the detected change points of content in the input video signal.

16. A signal processing apparatus according to claim 15, wherein the audio and video signals comprise a television broadcast signal, and the predetermined content comprise a commercial message.

17. A signal processing method for a signal processing apparatus to which audio and video signals are input, the audio and video signals having a plurality of contents in a time-division manner, the method comprising:

a video signal change-point detecting step of detecting change points of content in the input video signal; and an audio signal change-point detecting step of extracting the amplitude of the input audio signal in order to detect change points of content in the input audio signal based on the temporal change of the extracted amplitude, wherein a signal for predetermined content is detected based on a time interval between the detected change points of content in the input audio signal and between the detected change points of content in the input video signal.

18. A recording medium having recorded thereon a computer-readable program for a signal processing apparatus to which audio and video signals are input, the audio and video signals having a plurality of contents in a time-division manner, the program comprising:

a video signal change-point detecting step of detecting change points of content in the input video signal; and an audio signal change-point detecting step of extracting the amplitude of the input audio signal in order to detect change points of content in the input audio signal based on the temporal change of the extracted amplitude, wherein a signal for predetermined content is detected based on a time interval between the detected change points of content in the input audio signal and between the detected change points of content in the input video signal.

19. A program for a signal processing apparatus to which audio and video signals are input, the audio and video signals having a plurality of contents in a time-division manner, the program performing a computer-executable process comprising:

a video signal change-point detecting step of detecting change points of content in the input video signal; and an audio signal change-point detecting step of extracting the amplitude of the input audio signal in order to detect change points of content in the input audio signal based on the temporal change of the extracted amplitude, wherein a signal for predetermined content is detected based on a time interval between the detected change points of content in the input audio signal and between the detected change points of content in the input video signal.

* * * * *